(12) United States Patent
Twerdochlib (10) Patent No.: US 7,259,552 B2
(45) Date of Patent: Aug. 21, 2007

(54) WEAR MONITOR FOR TURBO-MACHINE

(75) Inventor: Michael Twerdochlib, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 12 days.

(21) Appl. No.: 11/140,655

(22) Filed: May 27, 2005

(65) Prior Publication Data

US 2005/0218887 A1    Oct. 6, 2005

Related U.S. Application Data

(63) Continuation-in-part of application No. 10/320,791, filed on Dec. 16, 2002, now Pat. No. 6,949,922, which is a continuation-in-part of application No. 10/158,954, filed on May 31, 2002, now Pat. No. 6,661,222.

(51) Int. Cl.
*G01B 7/14* (2006.01)

(52) U.S. Cl. .................................. 324/207.16
(58) Field of Classification Search ............ 324/207.16
See application file for complete search history.

(56) References Cited

U.S. PATENT DOCUMENTS

| | | | |
|---|---|---|---|
| 3,832,784 A | 9/1974 | Samuels et al. | |
| 4,053,989 A | 10/1977 | Yamaji et al. | |
| 4,136,556 A | 1/1979 | Graham | |
| 4,523,382 A | 6/1985 | Werner et al. | |
| 4,811,253 A | 3/1989 | Johns | |
| 4,820,980 A | 4/1989 | Dodson-Edgars | |
| 4,941,266 A | 7/1990 | Bissegger et al. | |
| 5,045,785 A | 9/1991 | Hansen | |
| 5,055,752 A | 10/1991 | Leistensnider et al. | |
| 5,095,638 A | 3/1992 | David et al. | |
| 5,111,592 A | 5/1992 | Aehnelt et al. | |
| 5,299,360 A | 4/1994 | Possati | |
| 5,952,589 A | 9/1999 | Leung et al. | |
| 6,288,537 B1 * | 9/2001 | Viertl et al. | ............ 324/230 |
| 6,513,262 B1 | 2/2003 | Borgognon et al. | |
| 6,519,860 B1 | 2/2003 | Bieg et al. | |
| 6,661,222 B1 | 12/2003 | Twerdochlib | |

FOREIGN PATENT DOCUMENTS

EP    0332575 A2    2/1989

* cited by examiner

*Primary Examiner*—Reena Aurora (57) ABSTRACT

A measurement device for measuring the wear of turbo-machine components to reduce the likelihood of component failure while a turbine-machine is at load. The measurement device is capable of measuring and calculating a distance between surfaces while the turbo-machine is at load. The distance may be compared with a measurement taken of the same location at another time to determine wear of a surface remote from the location of the measurement. The measurement device may be configured such that multiple measurements may be made on a single turbine engine by moving the measurement device from location to location.

18 Claims, 8 Drawing Sheets

WEAR MONITOR FOR TURBO-MACHINE

CROSS REFERENCE TO RELATED APPLICATIONS

This application is a continuation-in-part of U.S. patent application Ser. No. 10/320,791, filed Dec. 16, 2002 now U.S. Pat. No. 6,949,922, which is a continuation-in-part of U.S. patent application Ser. No. 10/158,954, filed May 31, 2002 now U.S. Pat. No. 6,661,222.

FIELD OF THE INVENTION

This invention is directed generally to measurement devices, and more particularly to measurement devices useful for determining wear in turbine engines at operating load.

BACKGROUND

The clearance between the stationary seals of a combustion turbine or compressor turbine and the tips of the rotating blades therein must not be so great as to permit an excessive amount of fluid to pass there between, and thereby reducing the efficiency of the turbine. On the other hand, clearances cannot be too small because high centripetal loading and high temperatures may cause blades to lift or to grow radially. Such blade lifting or radial growth can cause blade tips to rub the stationary seal and may eventually cause seal and/or blade tip damage.

In addition, the differences in thermal response time of the various turbine components can result in the mechanical interference between stationary and moving parts under certain conditions. This is certainly the case during the restart of a hot turbine where contact between the compressor/turbine blades and the stationary blade ring has resulted in massive compressor and turbine damage. Even a slight rub will destroy blade seals and reduce the efficiency of a combustion turbine. The obvious solution is to prolong restart until the turbine cools, however, this may require a delay of many hours. The situation is further complicated by the competing need to spin-cool the turbine following shutdown to prevent sagging or humping of the rotor. Both can be done only if the blade clearance is accurately measured, and appropriate action is taken based upon this on-line measurement.

Capacitance blade clearance probes are used to study blade clearance patterns to establish restart and spin-cool rules. However, capacitance probes are sensitive to handling and require careful calibration prior to each use. In particular, capacitance probes must be kept clean to ensure that they function properly, making their use limited to testing applications in carefully controlled environments. Consequently, capacitance clearance probes have proven to be both inaccurate and unreliable for commercial on-line monitoring. Additionally, capacitance clearance probes have proven to be unreliable in turbo-machinery applications for testing at low speeds of revolution, such as at turning gear speeds.

A number of blade clearance systems have been developed for steam turbines, such as those described in U.S. Pat. No. 4,987,555. These systems depend upon indicia on the blades shroud to obtain a meaningful proximity measurement. However, the approaches do not appear readily applicable to combustion turbine applications.

It is known to use eddy current testing systems coupled to pulsed eddy current probes for detecting voids, cracks, and corrosion in metal objects, such as described in U.S. Pat. No. 6,037,768. Such systems are commercially available from SE Systems, Inc. under the trade designation SmartEddy™, and from Eddy Current Technologies, Inc. under the trade name Ectmachine™. However, these systems have not been adapted to rotating turbo-machine blade clearance measurement applications.

Another problem common in turbine engines is the occurrence of component wear. The harsh operating temperatures and vibrations found in turbine engines under load often cause components in contact with each other to wear. Unmanaged component wear can damage a turbine engine. For instance, wear on roots of turbine vanes and turbine blades and vanes can cause movement of the components to such an extent that undesired interference with moving parts and damage can occur. Thus, there exists a need for monitoring the wear of turbine components to prevent turbine engine damage.

SUMMARY OF THE INVENTION

This invention is directed to a measurement device for determining wear in a machine, such as a turbo-machine. The measurement device may be configured to measure a distance between adjacent turbine-machine components and to compare that measurement with measurements taken at another time at the same location to identify wear. The measurement device may be formed from an electromechanical head assembly formed from a housing, at least one touch point extending from the housing for contacting a surface of the machine, and a drive device for moving the touch point in contact with the surface. The electromechanical head assembly may be releasably coupled to an insertion probe. The insertion probe may house at least a portion of the electromechanical head assembly and be adapted to be attached to a machine. The measurement device may also include a sensor for measuring a distance of travel of the touch point and may include an electrical conductor for transmitting an electrical current to the touch point for determining when the touch point has contacted the surface of the machine.

The measurement device may also include a drive device for moving the touch point. In at least one embodiment, the drive device may be formed from a stepper motor. The measurement device may also be configured to measure distances between surfaces that are generally parallel and orthogonal to a shaft of the electromechanical head assembly. In such embodiments, the electromechanical head assembly may include a ball socket attachment for supporting the touch point. The measurement device may also include an identification device, such as an identification key, for identifying a measurement with a particular location on a turbine engine so that other measurements taken at that location at different times may be compared against a particular measurement for wear determination.

The measurement device may be used to determine wear in a machine, such as, but not limited to, a turbo-machine, by attaching a measuring device to the machine, wherein the measuring device comprises an electromechanical head assembly comprising a housing, at least one touch point extending from the housing for contacting a surface of the machine, and a drive device for moving the touch point in contact with the surface. The measurement device may also include an insertion probe housing at least a portion of the electromechanical head assembly and attached to the machine, wherein the electronic head assembly is releasably coupled to the insertion probe. The measuring device may include a sensor for measuring a distance of travel of the touch point and an electrical conductor for transmitting an electrical current to the touch point for determining when the touch point has contacted the surface of the machine. The measuring device may be used to establish a benchmark from which a measurement may be taken. The touch point may then be extended from the benchmark to contact a surface of the machine. The measuring device may then determine a distance the touch point moved from the benchmark to contact the surface of the machine and compare the measurement against other measurements to determine an amount of wear of the machine using the measured distance. The measuring device may establish a benchmark from which a measurement may be taken by withdrawing the touch point into the insertion probe until a voltage applied to the touch point falls to zero. Similarly, the measuring device may establish the location of an adjacent surface of the machine by measuring a distance the touch point moved from the benchmark to contact the surface of the machine by advancing the touch point from the insertion probe until a voltage in the touch point falls to zero indicating that the touch point has contacted the surface of the machine.

An advantage of this invention is that one or more insertion probes may be attached to a single turbine engine and not removed. Rather, the insertion probes may remain attached to the engine proximate wear susceptible locations in the turbine engine, and a single electromechanical head may be inserted into each of the insertion probes to measure distances between adjacent surfaces to determine the extent of machine component wear. Such a system enjoys considerable cost savings and time efficiencies.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Throughout this specification, the term "turbo-machine" is used to refer to a device that includes rotating and stationary airfoils contained within a stationary casing used for the purpose of imparting energy into or extracting energy from a fluid passing over the airfoils.

Figure 1:
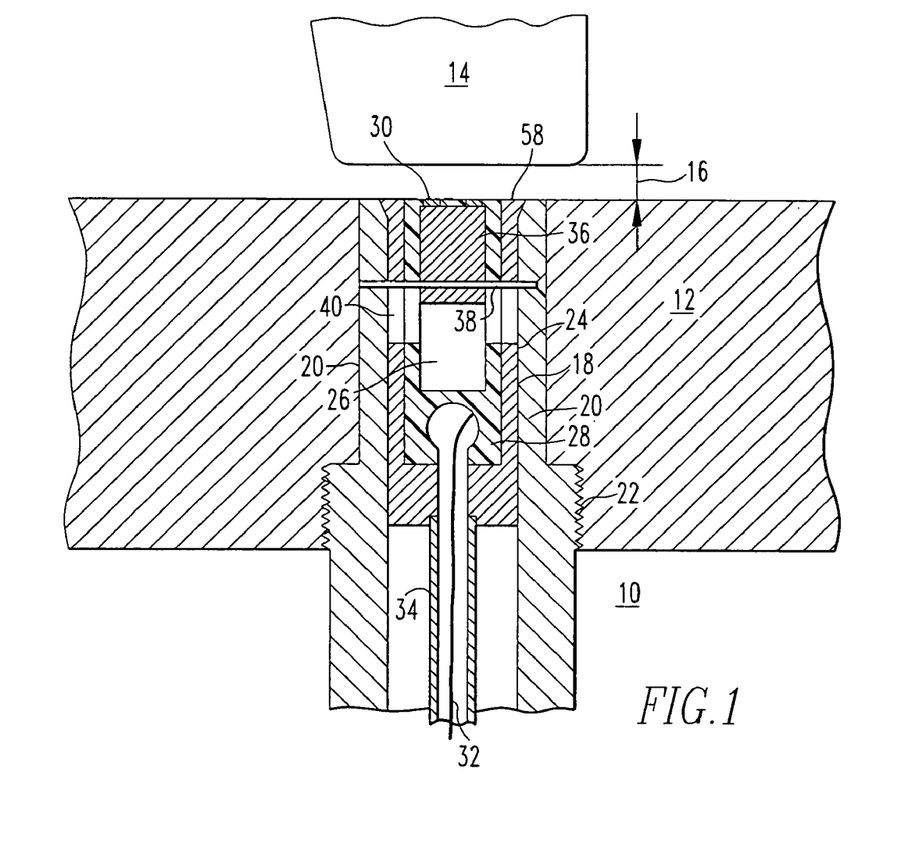
FIG. 1 is a plan view of a blade ring and compressor blade with the support structure, connecting rod and insertion probe assembly shown cut away and with the insertion probe shown in cross-section.

FIG. 1 illustrates the forward sensing portion of a blade clearance monitoring system 10 for monitoring the clearance 16 between a turbine blade, such as a compressor blade 14 and a stationary component of the turbine such as a blade ring 12. A very small eddy current search coil 30 is employed to provide a short range and sensitive indication by means of a discrete voltage signal level output, of the proximity of the blade tip and search coil in the order of 0.010 inch (0.254 mm). A search coil 30 that can be employed for this purpose preferably has an inner diameter from between 0.020 to 0.050 inch (0.508-1.27 mm). The search coil is mounted at an end of a short throw insertion probe 18. A short throw of approximately 0.25 inch (6.35 mm) can be employed for this purpose. In other words, the insertion probe 18 has an approximate range of movement in the radial direction towards the blade 14 of approximately 0.25 inch (6.35 mm). The insertion probe is slidably supported coaxially within an outer support 20 fixed within the compressor ring 12 by mating threads 22. The insertion probe has a thin outer stainless steel wall 24 having a thickness of, for example, 0.20-0.375 inch (5.08-9.525 mm). The interior of the insertion probe 18, surrounding an elongated hollow cavity 26, is filled with an epoxy or ceramic 28. The end of the insertion probe wall 24 juxtaposed to the compressor blade 14 is slightly enlarged to seat against a mating surface of the outer support 20 when the search coil 30 is seated flush with the surface of the blade ring opposing the compressor blade 14.

Figure 2:
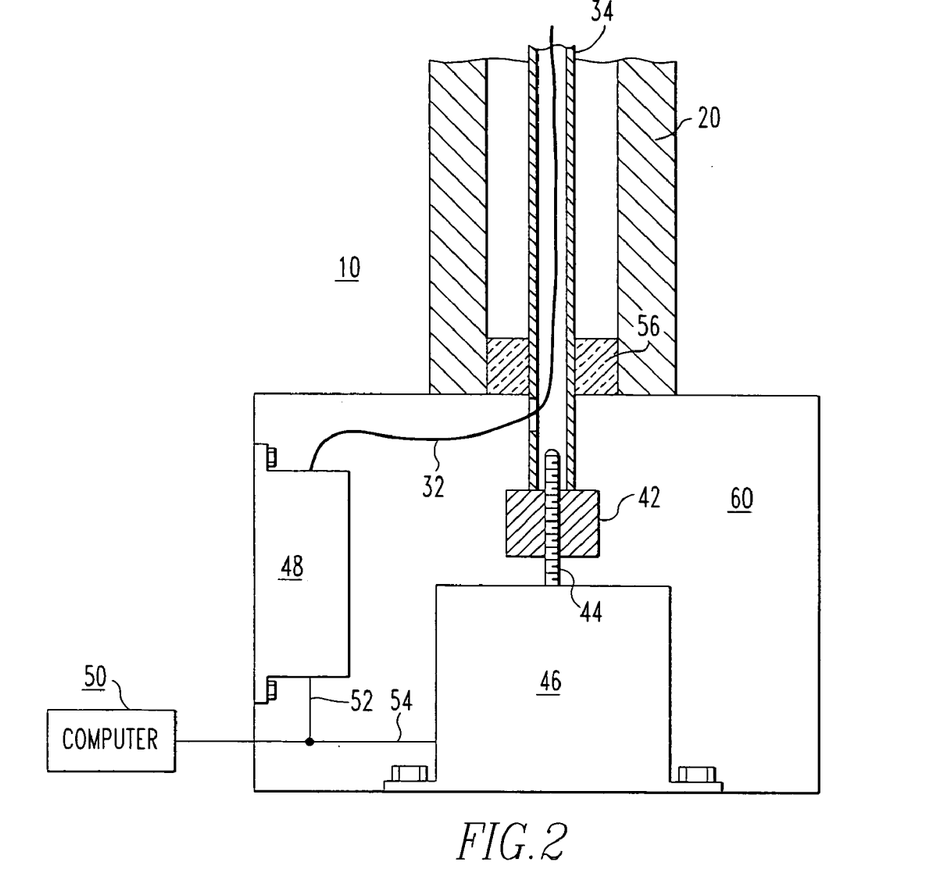
FIG. 2 is a plan view of the motor/controller portion of a monitoring system with portions cut away to reveal the interior operation thereof.

Radial translation of the insertion probe 18 towards and away from the compressor blade 14 within the support 20 is achieved by means of a connecting rod 34, screw action and computer controlled stepper motor drive assembly 60 mounted outside the turbine and shown in FIG. 2. Alternately, a pulsed D.C. motor and resolver can be employed. The D.C. motor provides more torque than the stepper motor and the resolver is connected to the motor's shaft and directly measures the shaft's rotation.

Confirmation that the search coil is properly seated in a position flush with the blade ring 12 surface, or zero position, is achieved by means of a hollow cylindrical electrically conductive slug 36 positioned within the hollow cavity 26 of the insertion probe 18, shown below the search coil 30 in FIG. 1. The reference slug 36 is affixed to the outer support member 20 by a pin 38 passing diametrically through axial slots 40 in the insertion probe 18 so that when the probe is driven radially, the pin 38 rides within the axial slots 40 maintaining the slug 36 in a fixed position relative to the support structure 20. The insertion probe 18 is thus free to translate within the fixed outer support 20 and over the fixed reference slug 36. The reference slug length and position within the outer support is set so the search coil provides a unique indication that the insertion probe's intruding surface into the gap between the blade 14 and the blade ring 12 is flush with the inner blade ring surface, hereafter at times referred to as the insertion probe "zero position." A point where the insertion probe is recessed from the inner blade ring surface by further withdrawing the probe from the zero position is referred to as the "calibration position" or "calibration point."

The signal from the proximity sensor coil 30 is communicated through the coil leads 32 which are threaded through the connecting rod 34 to the drive assembly 60 shown in FIG. 2. The signal 32 is connected to a search coil controller circuit 48, which communicates the discrete outputs 52 to a computer 50. The end of the connecting rod 34 opposite the insertion probe 18 is fitted with a female-threaded coupling 42 which is translated by a rotating screw 44 having a mating male thread, which is, in turn, driven by a stepper motor 46. The stepper motor 46 is controlled by the computer 50, which directs the number of steps to be taken and the direction of rotation of the motor 46. The motor 46 also preferably provides a position signal 54 to the computer 50, confirming the steps that have been taken. The drive assembly 60 also includes a pressure seal 56 that isolates the drive assembly 60 from exposure to the high-pressure interior turbine environment.

Blade clearance is measured relative to the zero position by advancing the insertion probe to a pre-selected radial distance from the blade, or reference position. For example, the pre-selected radial distance is 0.010 in (0.254 mm). This is the distance where the search coil signal peak amplitude indicates the longest blade is within the pre-selected distance of the insertion probe. The distance of the blade from the stationary member is then calculated from the motor step angle and screw pitch using the equation:

$$\text{Radial translation} = (\text{Number of motor steps}) \times (\text{Motor Rev Per Step}) \times (\text{Inch/mm per thread}) \quad (1)$$

In an aspect of the invention, a pulse driven DC motor with a resolver is used to drive the rotating screw 44. For example the resolver produces 512 pulses per revolution and a single additional pulse each revolution ("once-per-revolution" signal). Blade clearance measurements are made with respect to the zero position. The location of the zero position is established by advancing the probe 18 to the zero position as determined by receipt of the first once-per-revolution signal from the resolver. At the zero position, the gap measurement is preset to a predetermined negative number so that the gap measurement reads zero when the search coil 30 is at the flow surface. If calibration is requested, the search coil is withdrawn below the flow surface. The search coil is then advanced towards the flow surface to the zero position to establish the relation between the resolver and the position of the search coil 30 with respect to its mounting in the probe 18.

In a further aspect of the invention, basic operation of the probe is performed under the direction of processor, such as a programmable gate array. The measurement system also includes a computer 50, coupled to the probe processor, such as via a serial link. The computer 50 can instruct the probe to perform requested operations. For example, the computer 50 can instruct the probe to move to a specific gap distance or perform a "query" by advancing the probe from a zero position to a reference position, reporting blade clearance, and returning to the zero position. The computer 50 can also instruct the probe to perform a calibration procedure or "hover," wherein the probe is instructed to move to the reference position, and then move in and out to track blade tip gap changes and report blade clearance. In addition, the probe tip can be instructed to operate in a "sentinel" mode to make constant measurements from a fixed position.

Figure 3:
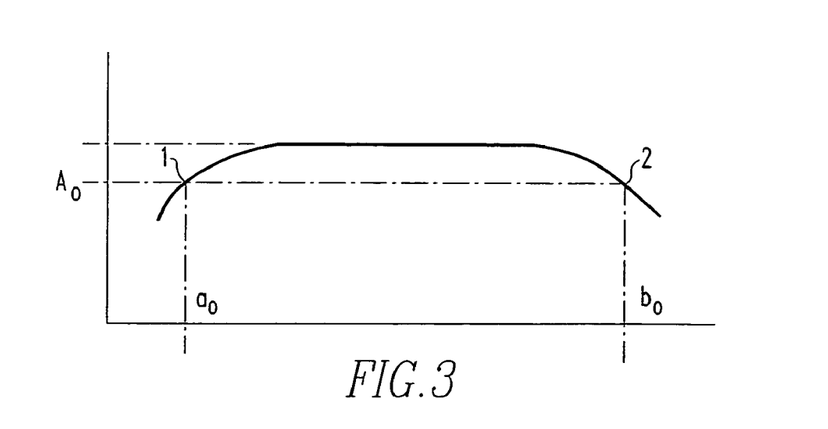
FIG. 3 is a graphical illustration of the proximity coil output signal plotted over the travel distance of the coil.

FIG. 3 graphically illustrates the search coil peak voltage output as a function of the travel distance of the coil. The Y-axis denotes the peak voltage on the excited search coil and the X-axis denotes the gap or distance from the search coil to the blade tip. As the search coil approaches the blade tip, the voltage on the excited search coil drops. This drop rate increases as the gap between the search coil and the blade tip becomes smaller. At a 0.005-0.020 inch (0.127-0.508 mm) gap, the slope, which shows the rate of the decrease of the peak voltage on the excited search coil as the gap between the search coil and the blade tip decreases, is high providing a sensitive determination of the search coil/blade tip gap. This coil voltage is $A_o$ (volts peak) when the gap is $a_o$. For example, this voltage is $6V_p$ at a 0.010 inch (0.254 mm) gap. When the coil voltage drops to $6V_p$, the coil/blade tip gap is thus determined to be 0.010 inch (0.254 mm).

Insertion probe movement is governed by control of the computer 50 using the algorithm:

[n is set so as to provide approximately 0.001 to 0.002" (0.025-0.05 mm) displacement]

---

(find reference position)

1. measure search coil signal peak amplitude "A" volts)
2. withdraw search coil "N" stepper motor steps
3. measure search coil signal peak amplitude "B" volts)
4. compare peak amplitude A and B
5. |A-B| < 0.001 goto 1 (on flat portion of the curve between points (1) and (2) shown in FIG. 3-need to withdraw further)
6. A < B go to 1
7. B > $A_o$ go to 1
8. stop-reference found (find blade clearance)
9. m = 0 (set motor step counter to zero)
10. step motor into turbine n steps
11. m = m + n
12. measure search coil signal peak amplitude "C" volts)
13. compare peak amplitude C and $A_o$
14. C > $A_o$ go to 11
    (measure blade clearance)
15. R_T = m*M_R_per_S*I_per_T + $a_o$
16. compare R_T and Alert_Level
17. Alert_Level > R_T goto 1 (no rub will occur between blade ring and blade tip)
18. Energize Alert Relay (if not 17 rub will occur)
    (repeat process)
19. go to 1 (make next measurement)

---

The alert level is determined by the computer based on the turbine condition, i.e., at turning gear, 132 minutes after a full load trip or at 2 minutes into spin cool cycle following 31 minutes at turning gear following full load unit trip. Under these conditions, the assigned radial translation for the alert level implies a rub will occur between the blade's tip and the blade ring at or below the alert level measurement.

Electrical continuity of the search coil 30 is continually monitored by the computer 50. Should electrical continuity or the proximity signal be lost as a result of unplanned contact with the blade, the insertion probe is returned to a retracted position and placed in a "sleep" mode.

In another aspect of the invention, a "failsafe mode" is provided in which the search coil 30 is automatically withdrawn from the turbo-machinery and returned to a "sleep position" when, for example, power to the measurement system is interrupted or an electronic malfunction occurs. The sleep position can be a position 0.05 inch (1.27 mm) or more below the flow guide inner surface or flow surface (for example, farther than the calibration position), and the withdrawal distance can be limited by a physical stop. In a further aspect, a large capacitor, connected to the motor through a normally on relay, can power the pulsed DC motor to withdraw the probe in the event of a power failure.

The insertion probe is constructed of epoxy or ceramic filled 0.250 to 0.375 inch (9.525 mm) thin-walled stainless steel tubing weighing a few ounces resulting in little possibility of blade or internal turbine damage should unplanned contact with the blade be made. In another aspect of the invention, the thin walled tubing is fabricated from a ceramic material.

A blade gap measurement could be taken every five seconds, but a five to fifteen minute cycle time is preferable given the thermal response time of the compressor. Probes are easily replaceable from outside the turbine. The system can also be applied to hot turbine blades if high temperature diamond or ceramic insulated wire and ceramic nonconductive materials are used. The stepper motor can easily operate in the temperature environment outside the compressor and turbine engine, which is less than 200° F. (93.3° C.). The support structure 20 can be constructed of any compatible metal that is capable of handling the caustic environment to which it is being exposed, such as stainless steel or a ceramic composite.

Figure 4:
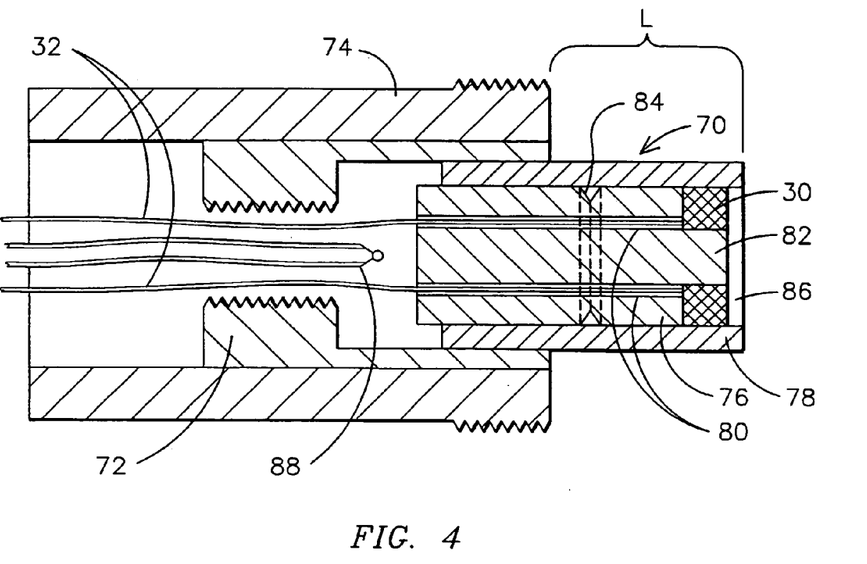
FIG. 4 is a plan view of an insertion probe comprising a ceramic pill shown in cross section.

FIG. 4 is a plan view of an insertion probe comprising a ceramic pill shown in cross section. In the embodiment shown in FIG. 4, the forward sensing portion of the blade clearance monitoring system includes a ceramic pill 70 mounted in a translatable sensor housing 72. The translatable sensor housing 72 is slidably supported coaxially within a bearing housing 74, that is, in turn, fixed in a stationary portion of the turbo-machine. Thus slidably mounted, the translatable sensor housing 72 is radially movable within the fixed bearing housing 74 so that the translatable sensor housing 72 including the ceramic pill 70 can be moved relative to the turbine blades.

The ceramic pill 70 is mounted with one end extending from the translatable sensor housing 72. The portion of the ceramic pill 70 extending from the translatable sensor housing 72 is positionable in the space between the stationary portion of the turbo-machine, such as the turbine ring, and the rotating blades. For example, the portion of the ceramic pill 70 extending from the translatable sensor housing, L, may be approximately 0.25 inch (6.35 mm) in length. In addition, the travel distance of the translatable sensor housing 72 radially into the turbo-machinery may be limited to a maximum throw distance corresponding to the length L of the extended portion of the ceramic pill 70, so that only the ceramic pill 70 portion of the translatable housing 72 is positioned in the space between the stationary portion of the turbo-machinery and the turbine blade.

To detect the proximity of the turbine blade when the ceramic pill 70 is extended into the turbo machinery, the search coil 30 is mounted on the end of the ceramic pill 70 extending from the translatable sensor housing 72. The search coil 30 may be potted 86, with, for example, fused silica ($SiO_3$), or provided with a ceramic cap (not shown) to protect the coil. In an embodiment, the ceramic pill 70 is made from a brittle, frangible ceramic material, such as alumina ($Al_2O_3$), so that if the pill 70 accidentally comes in contact with a turbine blade, the pill 70 will disintegrate into a powder without causing damage to the blade. Advantageously, the resulting powderized material will not damage other turbine blades in the turbo-machinery or clog cooling ports in the turbine ring and will pass through the turbine and be ejected without damaging the turbo-machine.

In an embodiment, the ceramic pill 70 includes a substantially solid inner ceramic coil support core 76 and an outer ceramic shield 78. For example, the outer ceramic shield 78 can have an outer diameter of 0.25 inch (6.36 mm) and an inner diameter of 0.188 inch (4.78 mm), and the coil support core can have an outer diameter of 0.188 inch (4.77 mm), allowing the support core 76 to be tightly mounted within the outer ceramic shield 78. The inner ceramic support core 76 includes two longitudinal holes 80, for example, having a diameter of 0.031 inch (0.79 mm), for passing the coil leads 32 of the search coil 30 through.

In a further embodiment, the support core 76 may include a coil-forming nipple 82 on a coil-mounting end, sized so that coil wire can be wrapped around the nipple 82 to form a search coil 30 having a desired geometric configuration to achieve specific electrical properties, such as low loss or a high Q-factor. For example, the nipple 82 can be sized so that a search coil 30 formed around the nipple 82 within the inner circumference of the outer ceramic shield 78 will have an inner diameter, a winding height, and a width of the same dimension (thus giving the coil an outside diameter of three times the inside diameter), such as 0.020 inch (0.508 mm).

The coil support core 76 is mounted coaxially within the outer ceramic shield 78 to form the integrated ceramic pill 70. In an embodiment, the outer ceramic shield 78 and the coil support core 76 are fabricated from $Al_2O_3$ so that the support core 76 and shield 78 are frangible and will disintegrate when impacted by a turbine blade. To facilitate breakage along a plane perpendicular to the axis of the coil support core 76 if the ceramic pill 70 comes in contact with the turbine blade, the coil support core 76 may include a stress riser in the coil support core 76. For example, the stress riser may be a fracture groove 84 formed circumferentially around the outer surface of the coil support core 76. The groove may be positioned around the outer surface of the coil support core 76 a distance from the coil-mounting end corresponding to the maximum throw distance, such as approximately 0.25 inch (6.35 mm) from the coil-mounting end. Consequently, the ceramic pill 70 will shear cleanly at the fracture groove if hit by a turbine blade when extended the maximum throw distance.

To provide an indication of the temperature near the ceramic pill 70, a temperature sensor 88, such as a thermocouple, may be provided. For example, the temperature sensor 88 can be mounted within the translatable housing 72 near the end of the ceramic pill 70 opposite the coil-mounting end. The temperature indication provided by the temperature sensor 88 can be used to compensate for characteristics of the search coil circuit affected by the temperature. Consequently, temperature induced variations can be nulled out according to the temperature reading within the translatable housing 72 near the ceramic pill 70.

In another embodiment, the search coil 30 is excited by step voltage pulse in a pulsed eddy current mode. In the pulsed eddy current mode, the search coil 30, when not positioned near conductive materials, will ring at a decaying resonant frequency in response to a step current charge. However, as the search coil nears a conductive surface, such as within 0.06 inch (1.524 mm) of a turbine blade (advantageously enabled by using a small coil size), some of the excitation energy will be transferred to the adjacent surface in the form of an induced eddy current, resulting in a detectable reduction in the amplitude of the resonate response by search coil 30. By correlating the amplitude of the resonant response of the search coil 30 with the corresponding distance of the search coil from an adjacent conductive surface, the proximity of the search coil to conductive surface can be determined by monitoring the resonant response amplitude. Accordingly, an apparatus for monitoring the clearance between a rotating turbine blade and a stationary portion of a turbo-machine may include an eddy current search coil 30 mounted near a position of the stationary portion of a turbo-machine traversed by a rotating blade during operation of the turbo-machine, and an eddy current tester connected to the eddy current search coil 30 for providing an indication responsive to a distance between the blade and the stationary portion as the blade traverses the position.

The advantages of using an eddy current search coil 30 in a pulsed eddy current mode are numerous and include the capability to use smaller coils to detect smaller gap distances. Significantly, heating of the search coil 30 caused by a pulsed excitation drive current is reduced compared to a coil driven by a continuous wave (CW) excitation current. In the pulsed eddy current mode, no drive current is supplied to the coil 30 during an inter-pulse period and energy is drained from the coil by the conducting diode, thereby allowing excitation current induced heat build up to be dissipated. As a result of the reduced heating, the pulsed eddy current mode provides significant advantages, including coil size and power handling capability. In addition, the duty cycle of the excitation source can be reduced to further allow energy to be dissipated.

Specifically, small coils made with small diameter wire and operating at very high turbine temperatures can be used in a pulsed eddy current mode because of the reduced heating associated with pulsed excitation currents. It is known in the art that smaller coils are more sensitive than larger coils. Accordingly, improved proximity resolution can be obtained using smaller coil sizes made possible by exciting the search coil 30 in a low heat inducing, pulsed eddy current mode. In addition, it is known that the smallest detectable structure using eddy current techniques is related to coil size. Typically, the coil inner diameter size cannot be larger than the smallest structure the search coil 30 is designed to detect. For example, to detect a turbine blade tip having a specific tip profile width, the search coil 30 cannot be larger, and typically needs to be smaller, than the tip profile width to detect the proximity of the turbine blade tip. Advantageously, pulsed eddy current excitation allows smaller coils to be used by limiting heat build-up in the search coil 30, and therefore, provides proximity measurement of correspondingly smaller structures. Reduced heat build-up may allow the search coil 30 to be operated at a higher power level and higher ambient temperatures, thereby allowing the blade to be accurately detected at a greater distance from the coil. In certain embodiments, it may be possible to achieve a desired detection capability without the need to translate the coil 30 away from the stationary portion of the turbo-machine toward the blades.

Figure 7:
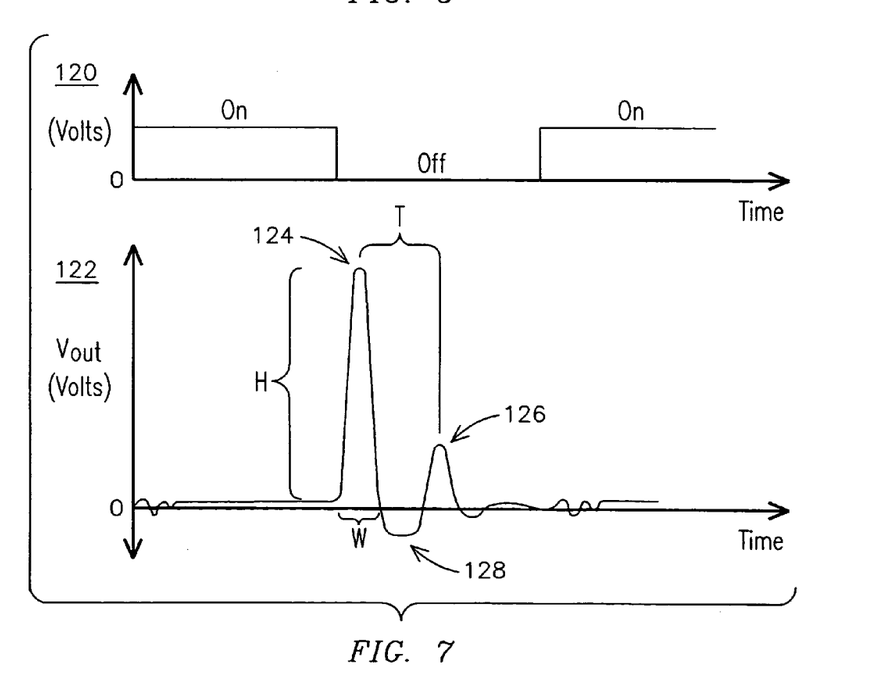
FIG. 7 is a graphical illustration of an exemplary excitation pulse and the corresponding pulsed eddy current coil response.

A further advantage of operating search coils 30 in the pulsed eddy current mode is that the excitation response to each pulse is independent of the response to other pulses, provided that the duty cycle is appropriately selected. As a result, each measurement represents an instantaneous "snapshot" of proximity that can be analyzed independently to extract information from the excitation response. FIG. 7 is a graphical illustration of an exemplary excitation pulse and the corresponding pulsed eddy current coil excitation response. As shown, the response 122 includes a first pulse 124 and second pulse 126. Information may be separately extracted for each pulse, such as individual pulse amplitude H, first pulse width W, and time period T between first pulse 124 and second pulse 126. Information may also be collectively extracted for trend analysis, such as temperature effects. In addition, maximum and minimum proximity information can be extracted from the collected independent data.

Figure 5:
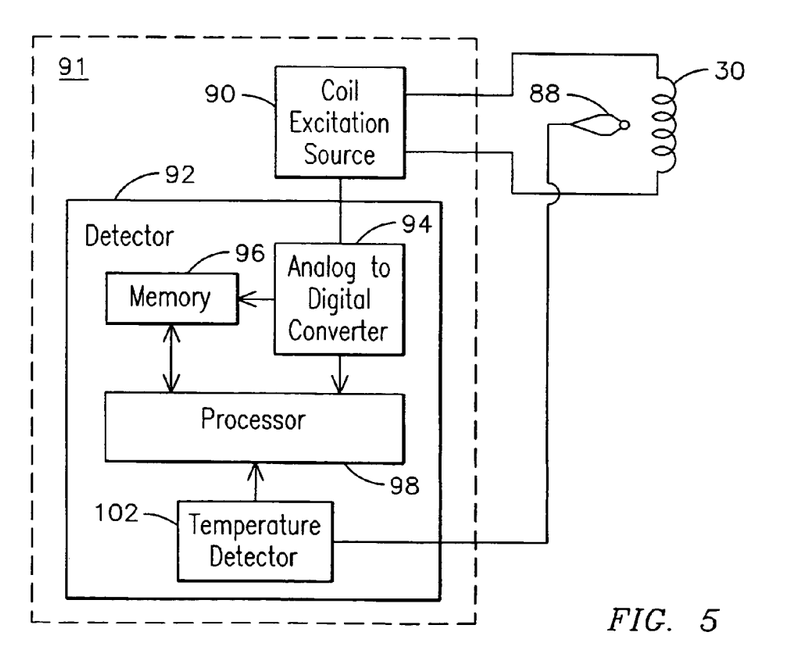
FIG. 5 is a functional block diagram of a pulsed eddy current apparatus for monitoring the distance between a rotating blade and a stationary portion of a turbo-machine.

FIG. 5 is a functional block diagram of a pulsed eddy current apparatus, including the eddy current search coil 30 and an eddy current tester 91, for monitoring the distance between a rotating blade and a stationary portion of a turbo-machine. The apparatus further comprises a coil excitation source 90 for providing an electrical signal to excite the eddy current search coil 30.

Figure 6:
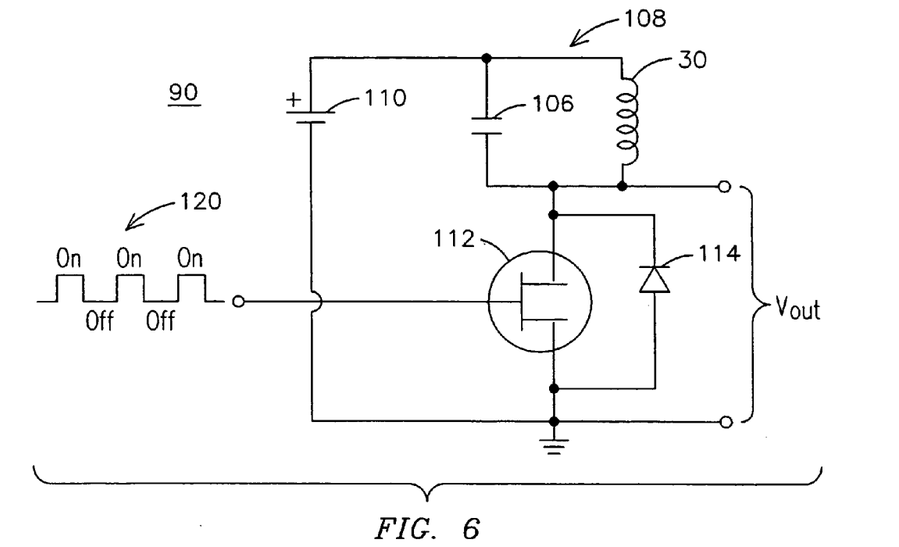
FIG. 6 illustrates a circuit diagram for an exemplary pulsed eddy current coil excitation source.

FIG. 6 illustrates a circuit diagram for an exemplary pulsed eddy current coil excitation source. In one embodiment, the coil 30 is coupled to a capacitor 106 in a resonant tank circuit 108, a power supply 110, a FET 112 and a diode 114. FET 112 is driven by an excitation pulse train 120 to turn the FET 112 on or off corresponding to the state of the pulse train 120. In one aspect of the invention the duty cycle of the pulse train 120 may be 50%. In an embodiment, when the pulse train 120 input is high, the FET 112 is turned on, or conducts, and when the pulse train 120 input is low, the FET 112 is off, or does not conduct. When the FET 112 is on, the tank circuit 108 is charged by the power supply 110. When the FET 112 is switched off, the magnetic field created as the tank circuit 114 was being charged will collapse rapidly, developing a voltage response 122 measured across the FET 112.

As shown in FIG. 7, the excitation response 122 includes a first pulse 124 and second pulse 126. According to an embodiment of the invention, the pulse height H of the first pulse 124 is responsive to the proximity of a turbine blade. If the coil 30 is proximate a turbine blade when excited, the resulting pulse height H will be lower than if no blade were present. In addition, other information may be separately extracted from the responses, such as first pulse width W, and time period T between first pulse 124 and second pulse 126. In another aspect of the invention, the peak first pulse height H may be limited by controlling the voltage of the power supply 110. In yet another aspect, the negative swinging portion 128 of the negative voltage pulse following the first response 124 may be nulled or eliminated by the diode 114, limiting or clipping the negative swinging portion 128 to approximately −0.3 volts to −0.5 volts. By limiting the negative swinging portion 128, the excitation response 122 decays more rapidly so that there is no residual response present when the next excitation pulse 120 occurs. As a result, each excitation response 122 measurement is independent of other excitation responses 122.

The apparatus 91 further comprises a detector 92 for detecting the excitation response 122 of the eddy current search coil 30 in response to conditions within the turbo-machine. In an embodiment, the detector 92 further comprises an analog to digital converter 94 for digitizing detected excitation responses 122 of the eddy current coil 30, a memory 96 for storing the digitized responses, and a processor 98, such as a programmable gate array, for processing inputs to determine when the eddy current search coil 30 is positioned a pre-selected distance away from a closest blade.

In one aspect of the invention, the processor 96 receives the digitized excitation responses and determines, based on the received digitized responses, a minimum excitation response and a maximum excitation response corresponding to a condition when the eddy current coil 30 is in closest proximity to the blades and a condition when the eddy current coil 30 is farthest from the blades, respectively. Having determined the maximum and minimum response for a sampling period, such as one second, the processor 98 calculates a difference value corresponding to the difference between the maximum excitation response and the minimum excitation response. The processor 98 then determines, based on the difference value, when the eddy current coil 30 is positioned a pre-selected distance away from a closest blade. For example, the processor can use the temperature indication to correct for temperature dependencies in the turbine blade metal and thermal expansion of the part of the probe inboard of the zero position where the probe is mounted in the blade ring.

In addition, a temperature detector 102, coupled to a temperature sensor 88, may be included in the detector 92 to provide the processor 98 a temperature indication of the temperature near the search coil 30. The processor 98 can use the received temperature indication to compensate for changing temperature conditions when determining when the probe tip is positioned a pre-selected distance away from a closest blade.

A method of using a search coil 30 in the pulsed eddy current mode to detect the clearance between a rotating blade and a stationary portion of a turbo-machine will now be described. Generally, the method includes positioning an eddy current coil 30 near a position of the stationary portion of a turbo-machine traversed by a rotating blade during operation of the turbo-machine and providing an electrical signal to excite the eddy current coil 30. The excitation response 122 of the eddy current search coil 30 in response to the conditions within the turbo-machine is then detected. Based upon the excitation response 122, the point at which the eddy current coil 30 is positioned a pre-selected distance away from a closest blade is then determined. As previously described, the minimum blade tip clearance from the stationary portion of the turbo-machinery can then be determined by measuring the mechanical advance of the eddy current search coil 30 and adding the pre-selected distance to the mechanical advance distance to achieve a total blade tip clearance value. As described above, it may also be possible to determine the blade clearance without advancing the coil 30. In such an embodiment, the response of the coil 30 from its fixed position would be directly responsive to the minimum blade tip clearance.

More specifically, in the pulsed eddy current mode, the coil excitation source 90 generates a step voltage pulse train to excite (i.e., create a magnetic field in) the search coil 30. For example, the search coil 30 can be excited by a current wave created by the FET 112 turned on and off by a step voltage pulse train 120 at a selective frequency of approximately 1 to 5 megahertz. The FET 112 creates a current switch corresponding to the step voltage pulse train input that alternately charges the tank circuit 108 to a maximum current, and then abruptly turns off the current, creating a response in the tank circuit 108. The eddy current search coil 30, in conjunction with the capacitor 106, responds at the characteristic response frequency of the tank circuit 108, producing a voltage excitation response 122 across the FET 112. The parameters of the response are indicative of the proximity of the turbine blades. The detector 92 detects the excitation response 122. For example, the detection process may include measuring an amplitude parameter, or height H, of the detected excitation response 122.

To ensure that the detected excitation responses reflect conditions where each blade tip is directly over the search coil 30, the frequency of the excitation of the search coil 30, and the period of testing are selected to ensure that each blade tip is induced with a pulsed eddy current several times during one turbine revolution. For example, in a turbine rotating at 3600 RPM and an excitation frequency of one MHz, each blade tip will be induced with a pulsed eddy current approximately seven times during each turbine revolution and a one second testing period is sufficient to acquire gap data. At slower turbine rotating speeds, such as at a turning gear speed of 5 RPM, data can be collected for a twelve (12) second period to ensure that the collected data comprises data for each blade tip positioned directly over the search coil 30.

As the excitation responses 122 are detected, the responses are digitized in the analog to digital converter 94 and stored in the memory 96. In one embodiment, the responses are detected in pre-selected time windows. For example, a first time window corresponds to a time when each first response occurs and a second time window corresponds to a time when each second response occurs, respectively. Most samples collected in this manner represent times when turbine blade tips are not positioned above the search coil and no eddy current is induced (turbine blade tips are out of range of the search coil 30), resulting in a maximum excitation response. Conversely, a minimum excitation response is recorded whenever the closest turbine blade tip is positioned directly over the search coil 30. In another embodiment, the maximum and minimum detected values can be determined by performing a peak hold function in each of the pre-selected time windows.

In an aspect of the invention, the processor 98, accessing the digitized excitation response stored in memory 96 for a pre-selected time window, determines a minimum excitation response, based on the lowest amplitude first pulse height H in the first time window, and a maximum excitation response, based on the highest amplitude first pulse height H in the first time window, corresponding to a condition when the eddy current coil is in closest proximity to a turbine blade and a condition when the eddy current coil is farthest from the blade (out of range), respectively. In an embodiment, the minimum and maximum values can be directly derived from peak hold data. For example, in a sampling period of 1 second, 2 million excitation responses may be detected, but only the maximum response and the minimum response are saved.

In another aspect, an average value for a number of minimum excitation responses and maximum excitation responses may be determined, whereby the average value serves to reduce noise and filter unwanted effects. For example, the five lowest excitation responses and the five highest excitation responses may be used to calculate an average minimum excitation response, and an average maximum excitation response, respectively. In another aspect, one of the five highest excitation responses that is most different from the other four is discarded, and the average computed using the other four responses.

Using the minimum and maximum responses, the processor 98 then calculates a difference value corresponding to the difference between the maximum excitation response and the minimum excitation response. Advantageously, the difference value effectively nulls out any first order temperature variation effects that can become large in comparison to the excitation responses.

Based on the calculated difference value, the processor 98 determines when the eddy current coil 30 is positioned a pre-selected distance away from a closest blade, such as 0.01 inch (0.254 mm). For example, the pre-selected distance can be selected experimentally by determining a position where the search coil 30 exhibits the most sensitivity in the presence of conducting material, without being so close to the conducting material that the coil search coil 30 might be damaged, such as by rapid changes in the shaft or case position caused by turbine vibration. Once the processor determines the search coil 30 has reached the pre-selected distance, further movement towards the turbine blades is stopped and a total blade gap distance is calculated by adding the pre-selected distance to the monitored distance traveled by the translatable sensor housing 72, as previously described.

In another aspect of the invention, the processor 98, accessing the digitized excitation responses stored in memory 96, determines a maximum excitation response first pulse width and a minimum excitation response first pulse width. The processor 98 then calculates a first pulse width difference value corresponding to the difference between the minimum excitation response first pulse width and the maximum excitation response first pulse width. For example, the pulse width measurement can be used to detect an erroneous pulse, such as a pulse not within pre-defined measurement boundaries, and the sample containing the erroneous pulse can be discarded.

Based on the first pulse width difference value, the processor 98 then determines if an anomalous condition exists within the turbo machinery. For example, anomalous conditions that might cause the response first pulse width W to change in value might be an interfering object in the turbo-machinery, or a damaged or shorted coil 30. Further, electromagnetic interference (EMI) might also cause an anomalous condition, manifested as a varying first pulse width.

In yet another aspect of the invention, the processor 98, accessing the digitized excitation responses stored in memory 96, determines the time period between the first response pulse and the second response pulse for each digitized response. The processor 98 then monitors the time period between the first response pulse and the second response pulse for successive digitized responses, for example over a sampling period. The processor 98 then determines if the time period between the first response pulse and the second response pulse for successive digitized responses is varying, such as variances caused by changing temperature. In one aspect of the invention, if the time period is varying, the processor can provide an adjustment signal to compensate for the variance.

In an embodiment, the turbine blade gap measurements can be made in a process referred to as a "query." For example, the computer 50 can instruct the probe to advance from a zero position to a reference position, report blade clearance, and then return to the zero position according to the following steps:

1. Advance search coil from a zero position to a reference position, while constantly detecting the coil excitation response and making measurements as the search coil is advanced (A very short sampling time, such as 0.1 second, may be used to shorten the measurement time.)
2. When the measurements indicate that the coil is near the reference position, make measurements over a full sampling period (at a minimum, 1 shaft revolution.)
3. When the measurements indicate that the coil is at the pre-selected reference position, calculate blade clearance as: (resolver counts as coil moved from zero position to reference position−resolver count from zero position to flow surface)*(resolver counts per revolution of the rotating screw 44, such as 512 counts per revolution)*(screw pitch, such as mils per revolution)+the pre-selected reference distance, such as 10 mils.
4. Send measurement to controller and return coil to zero position.
5. If blade clearance is less than an alarm threshold distance, issue an alarm (or wait to make another measurement).

In an alternative embodiment, a measurement device 200, as shown in FIGS. 8-12, may be configured to determine wear in a machine by measuring the displacement of the surface over time relative to a benchmark. The measurement device 200 may be configured to measure wear surfaces in a plurality of positions, such as, but not limited to, radial normal (RN), axial normal (AN), and tangential normal surfaces. By measuring wear in a machine, such as a turbo-machine, components of the machine may be replaced before failure, as a result of contact with moving parts. In one particular application, the measurement device 200 may be used to determine wear of turbine airfoil roots to identify dangerous wear conditions that may allow a turbine airfoil to contact a rotor, shroud, blade, or other turbine component.

Figure 8:
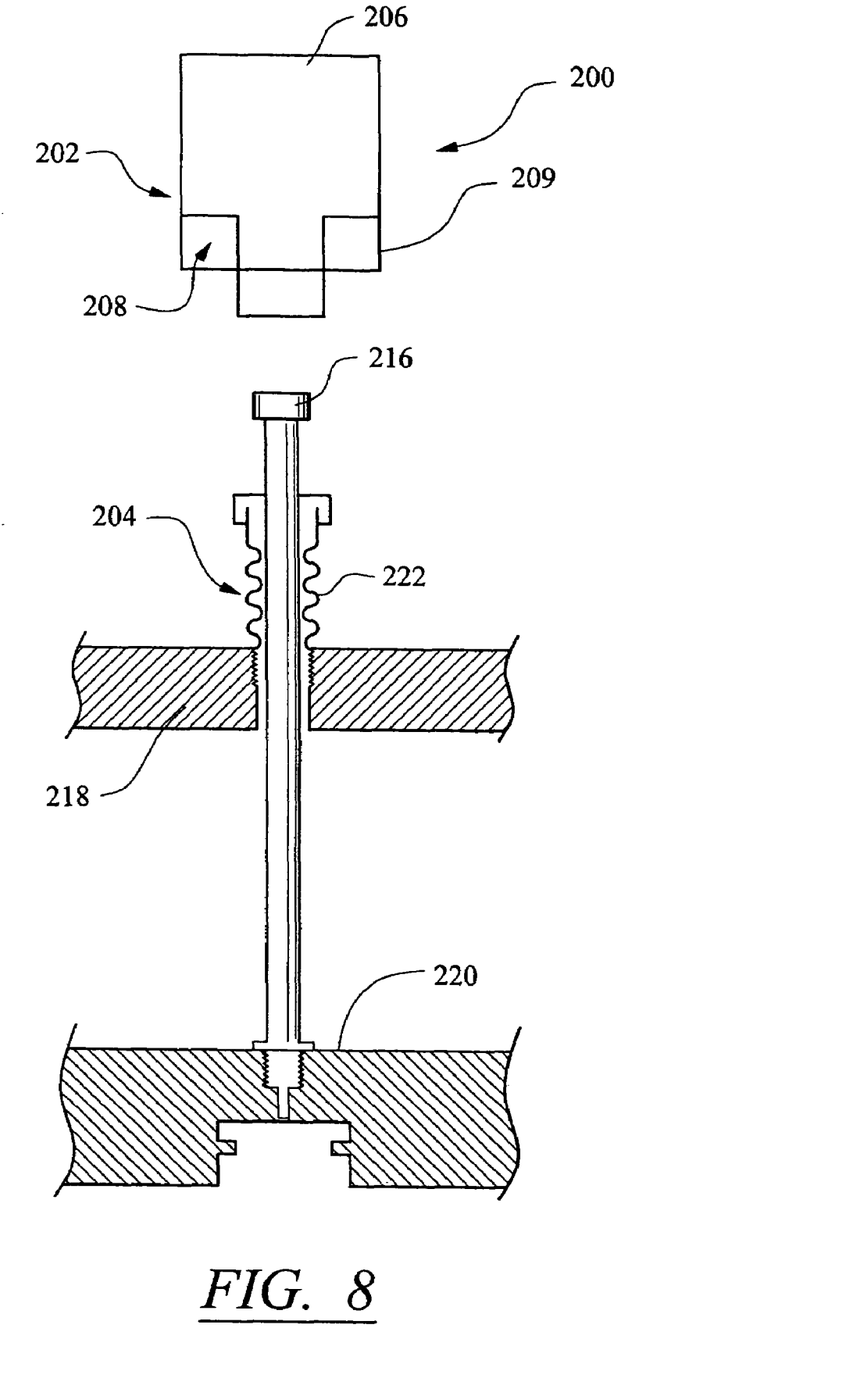
FIG. 8 is an exploded view of a measurement device of this invention.

As shown in FIG. 8, the measurement device 200 may be formed from an electromechanical head assembly 202 configured to fit into an insertion probe 204. In at least one embodiment, the insertion probe 204 may be adapted to be attached to a portion of a turbo-machine such that the electromechanical head assembly 202 may be inserted into the insertion probe 204, a measurement may be taken, and the electromechanical head assembly 202 may be removed from the insertion probe 204 204. A single turbo-machine may include one or a plurality of insertion probes 204 positioned at various locations of a turbo-machine to analyze wear of turbine airfoil roots and other turbine components. The insertion probes 204 enable a single electromechanical head assembly 202 to be used to measure wear at a plurality of locations in a time efficient manner.

The electromechanical head assembly 202, as shown in FIG. 8, may be formed from a housing 206 containing a drive device 208 for positioning a touch point 210 to determine component wear. The drive device 208 may be any device capable of moving a touch point 210 and capable of being adapted to a system for measuring and recording the movement of the touch point 210. In at least one embodiment, as shown in FIG. 8, the drive device 208 may be a stepper motor. The pulsed or stepper motor may rotate a shaft 212 that supports the touch point 210. A pulse width modulated DC motor may be preferred because of hither torque. Rotation of the shaft 212 may advance or retreat the shaft 212, depending on direction of rotation, due to threads 214. The amount of rotation of the shaft 212 may be determined by a sensor 209. The stepper motor may facilitate movement of the shaft 212 and touch point 210 in precise increments, such as, but not limited to about 0.0003 inch increments. The electromechanical head assembly 202 may be attached to an insertion probe 204 with a releasable attachment mechanism 216, such as, but not limited to, threads, a conventional quick connect connector, or other appropriate mechanisms. The electromechanical head assembly 202 may be interfaced with a personal computer, a micro controller, a programmable logic controller, or other computing device for controlling movements, storing measurements and calculating differences in measurements to determine wear.

The insertion probe 204, as shown in FIG. 8, may be configured to receive the electromechanical head assembly 202. In at least one embodiment, the insertion probe 204 may be a generally cylindrical tube having a length sufficient to extend from outside a casing wall 218, through the wall 218, and attach to a vane carrier 220. The insertion probe 204 may be releasably attached to the vane carrier 220 through use of threads, an interference fit, or other appropriate devices or methods or may be permanently attached to the vane carrier 220 with welding, brazing, or other appropriate methods. The insertion probe 204 may be sealed to the casing wall 218 using one or more bellows 222.

Figure 11:
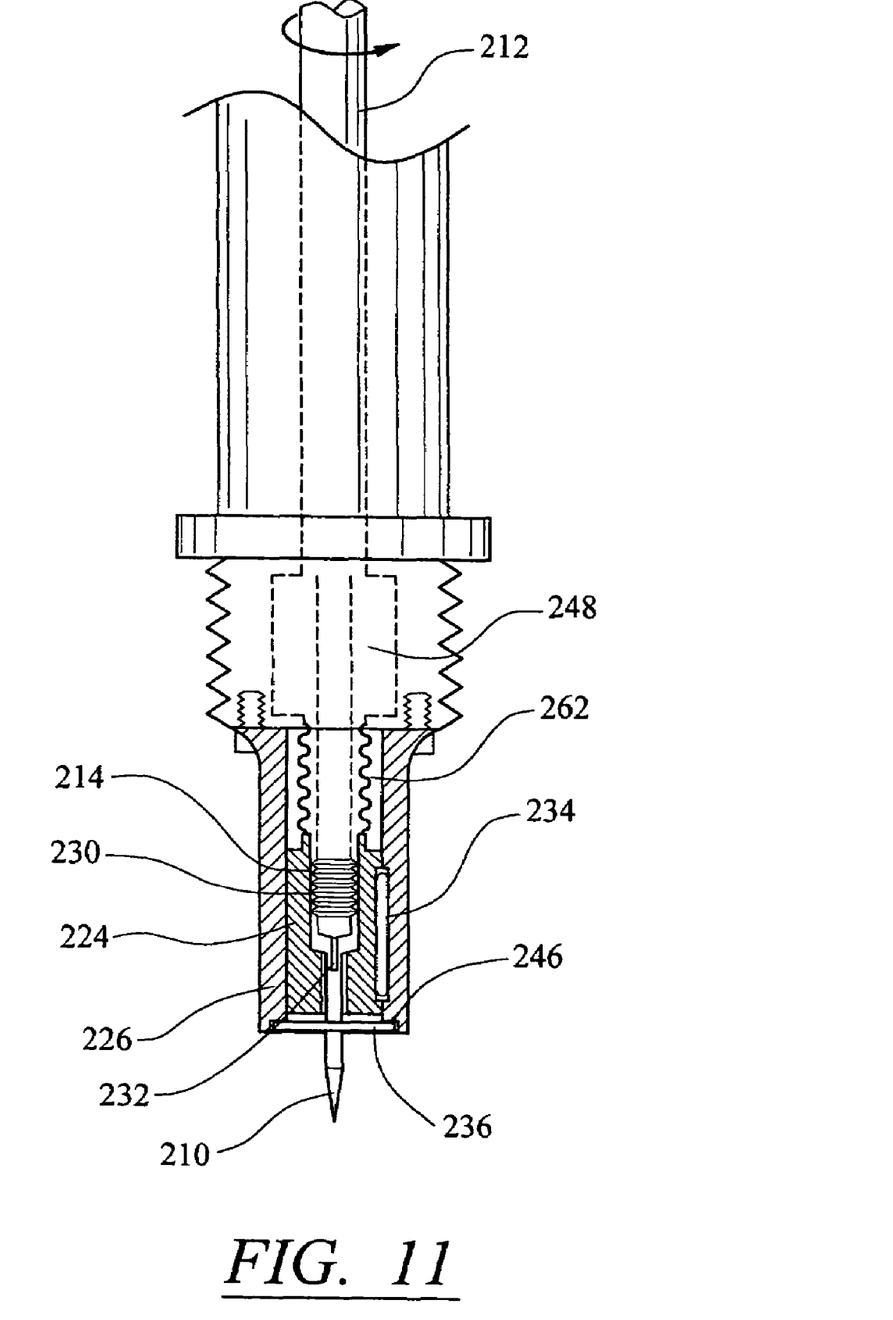
FIG. 11 is a partial cross-sectional view of the measurement device as shown in use in FIG. 9.
Figure 12:
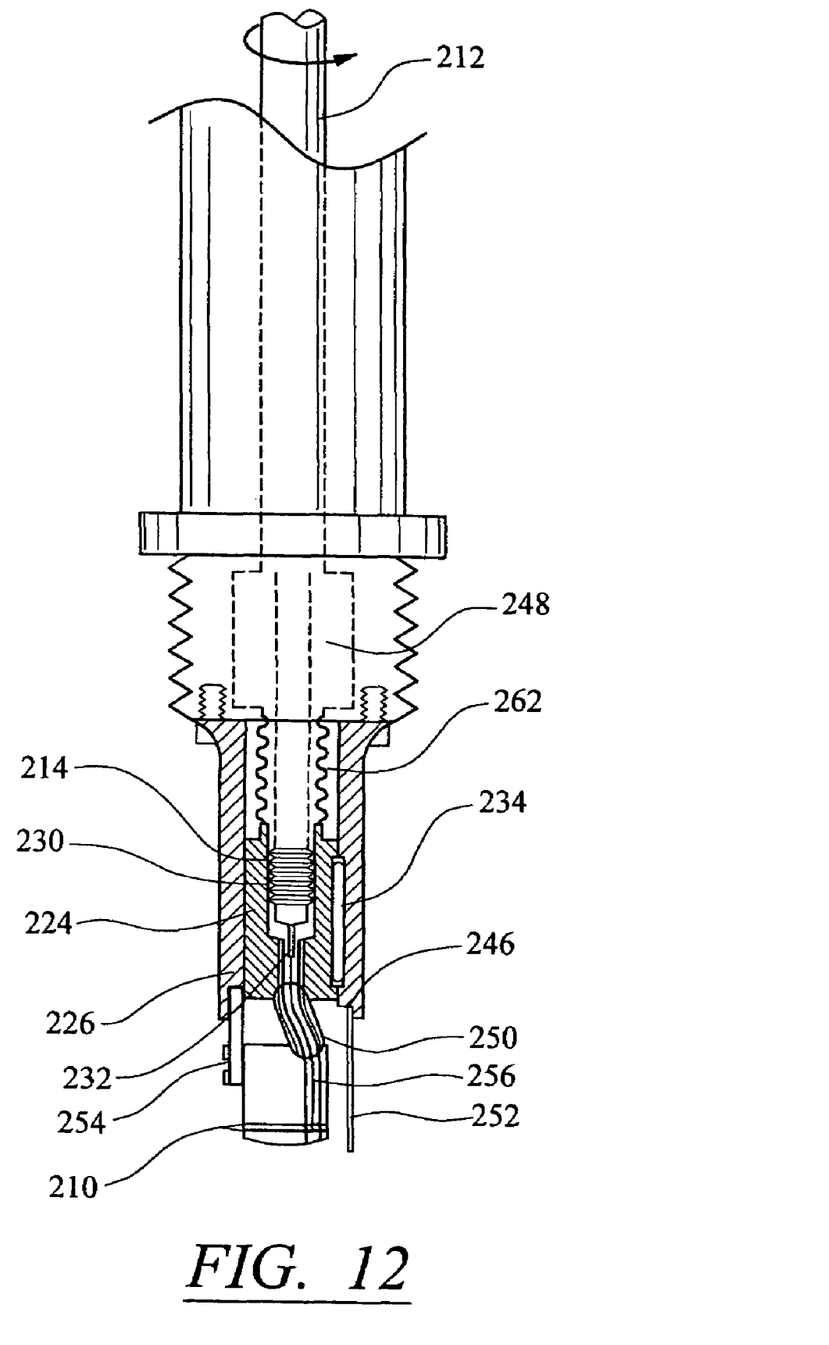
FIG. 12 is a partial cross-sectional view of the measurement device as shown in use in FIG. 10.

As shown in FIG. 11, the shaft 212 may extend into the insertion probe 204 and include a translation assembly 224. The translation assembly 224 may be contained within a nose member 226 of the insertion probe 204. The translation assembly 224 is moved by rotating the shaft 212. The threads 214 cause the translation assembly 224 to move in or out. The translation assembly 224 is housed within the nose member 226, which removes the effects of thermal expansion on the measurement.

The shaft 212 may include a bearing 248, which may be, but is not limited to being, ceramic, for positioning the shaft 212 within the insertion probe 204. The shaft 212 may include threads 214 that mate with threads 230 extending from the translation assembly 230. The touch point 210 may be attached to the translation assembly 224. A conductor lead 232 may couple the touch point 210 with the shaft 212. A key 234 may be used to prevent the translation assembly 224 from rotating relative to the nose member 226. The key 234 may fit in a cavity positioned in the translation assembly 224 and in the nose member 226. A flange 236 may attached to the touch point 210 and be used to establish a benchmark. A pressure boundary bellows 262 may be positioned around the shaft 212 for sealing the electromechanical head assembly 202 to the insertion probe 204.

Figure 9:
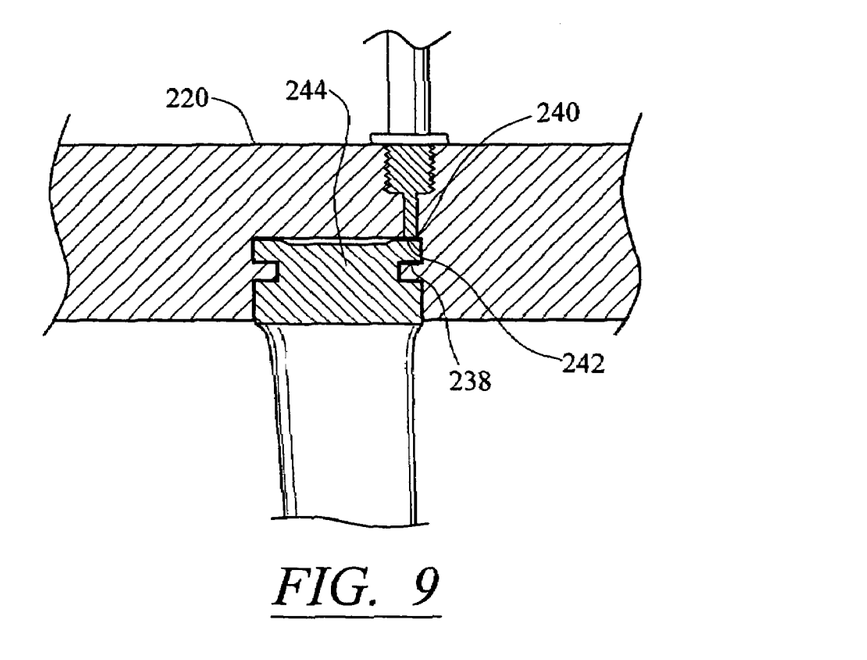
FIG. 9 is a partial cross-sectional view of the measurement device of FIG. 8 attached to a turbine engine proximate to an airfoil root.

As shown in FIG. 9, the measurement device 200 may be used to measure wear on surface 238 by monitoring the distance between vane carrier surface 240 and vane root surface 242. The measurement is made by determining the movement of a surface different from, but near the actual wear surface. All measurements are made while the unit is at speed and typically under load to insure the parts are seated by aerodynamic forces, and are in thermal steady state. The actual wear surface is not measured for ease of measurement. A first measurement may be taken to establish a benchmark. The measurement may be taken while the turbine engine is at load and the components have thermally expanded to load conditions. Subsequent measurements may be taken to determine whether the vane root 244 has worn and more particularly, if the vane root 244 has worn beyond a critical dimension.

More specifically, the touch point 210 is held within the nose member 226 in close proximity to a reference pull back position in which the touch point 210 contacts the nose member 226. When the electromechanical head assembly 202 is installed in the insertion probe 204, the touch point 210 extends from the nose member 226. A benchmark for wear may be established when the vane root 244 has not been used within the turbine engine. The benchmark may be established by withdrawing the touch point 210 in precise steps, such as in 0.0003 inch increments, until the touch point 210 touches the pull back reference surface 246. The point at which the touch point 210 touches the pull back reference surface 246 may be determined by monitoring an electrical voltage in the touch point 210, which is applied through the conductor lead 232. When the flange 236 of the touch point 210 touches the pull back reference surface 246, the voltage in the touch point 210 falls to zero. The angular position of the shaft threads 214 used to induce the movement is accurately measured with the shaft mounted optical resolver and recorded in the electromechanical head assembly 202.

The touch point 210 then advances toward the vane root surface 242 in short precise steps, such as about 0.0003 inches, until the touch point 210 contacts the vane root surface 242. At contact, the voltage in the touch point 210 becomes zero. The distance between the pull back reference surface 246 and the vane root surface 242 is calculated and recorded in the electromechanical head assembly 202. The measurement is not affected by thermal expansion because displacement measurement is determined using a screw action in the nose member 226. The distance may be recorded specifically for the particular measurement location using an identifier tag, which may be, but is not limited to being, an internal ID key resistor. Once the measurement has been completed, the touch point 210 returns to the starting position, after which, the electromechanical head assembly 202 may be removed from insertion probe 204 at any time.

This measurement may be taken at any time to determine wear and to prevent failure of the turbine components due to unacceptable levels of wear on the vane root 244. In at least one embodiment, movement of the touch point 210 toward the vane root surface 242, after a user activates a start request, is performed automatically once the pull back reference surface 246 is located. In at least one embodiment, the maximum distance of travel by the touch point 210 may be about 0.100 inches to about 0.200 inches.

Figure 10:
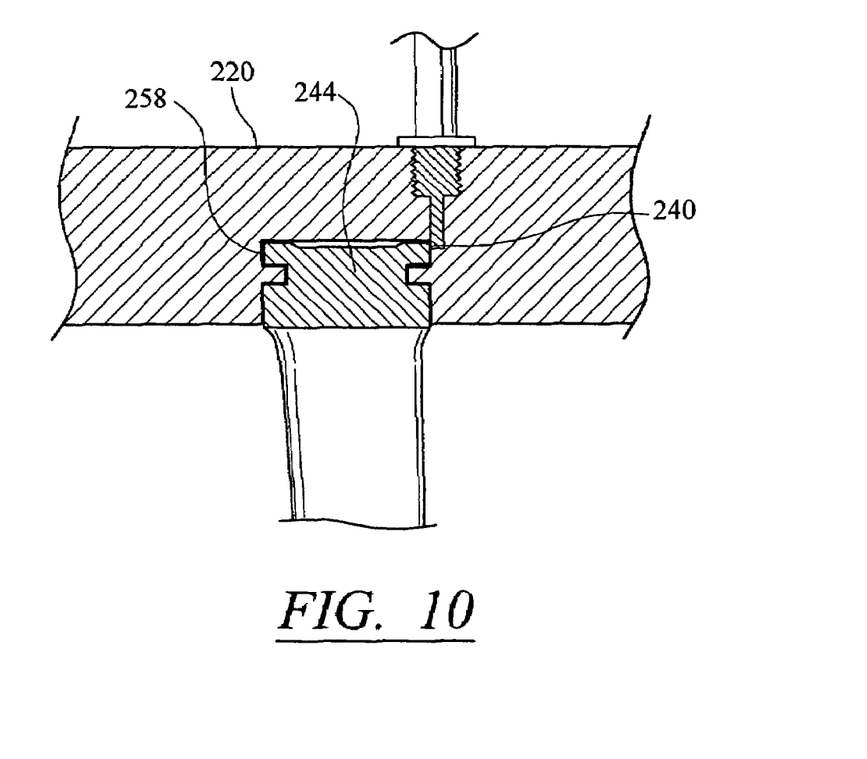
FIG. 10 is a partial cross-sectional view of the measurement device of FIG. 8 attached to a turbine engine proximate to an airfoil root to measure a surface in a different orientation than shown in FIG. 9.

The measurement device 200 may also be configured to measure wear on a surface of a component of a turbomachine that is perpendicular to a longitudinal axis of the turbine engine, as shown in FIG. 10. The measurement device 200 may include many of the components as previously described. In addition, the measurement device 200 may include a ball socket 250 attached to the end of the shaft 212, which enables the touch point 210 to be aligned generally orthogonally to the shaft 212. The ball socket 250 may be contained within a shield 252 extending from the nose member 226. The shield 252 may be generally cylindrical. A spring 254, such as, but not limited to, a flex spring, may be positioned proximate to the nose member 226. The flex spring 254 allows the swinging head 255 to move perpendicular to the instrument's shaft under return force. The flex return force returns the swinging head 255 as the shaft withdraws. A shaft 256 may extend from the ball socket 250. A touch point 210 may be attached to the shaft 256 and extend generally orthogonal to the shaft 256. The measurement device 200 shown in FIG. 12, may be used, as shown in FIG. 10, to determine the wear occurring at wear surface 258 by measuring the distance between a pull back reference surface 246 and a vane root side surface 260 and comparing this measurement with the same measurement taken later in time after the turbine engine has run under load for a period of time. To determine whether the wear in the root may cause problems while the turbine engine is operating at load, the measurements may be taken while the turbine engine is operating at load. During use, the translation assembly 224 is advanced by rotation of the shaft 212, causing the ball socket 250 to move the swinging head 255 perpendicular to the shaft 212 until the vane surface is contacted. This movement is not a linear movement, however a control device stores a transfer function relating movement of the translation assembly 224 and the movement of the swinging head 255. The transfer function may be determined by calibration.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

I claim:

1. A measurement device for determining wear in a machine, comprising:
    an electromechanical head assembly comprising a housing at least one touch point extending from the housing for contacting a surface of the machine, and a drive device for moving the touch point in contact with the surface;
    an insertion probe housing at least a portion of the electromechanical head assembly and adapted to be attached to the machine;
    wherein the electromechanical head assembly is releasably coupled to the insertion probe;
    a sensor for measuring a distance of travel of the touch point;
    an electrical conductor for transmitting and conducting an electrical current to the touch point for determining when the touch point has contacted the surface of the machine.

2. The measurement device of claim 1, wherein the insertion probe is coupled to the machine.

3. The measurement device of claim 2, wherein the insertion probe is coupled to a vane carrier of a turbine engine and protrudes into the vane carrier to provide access for the measurement device to a root of an airfoil during operation of the turbine engine.

4. The measurement device of claim 3, wherein the touch point is movable generally parallel to a longitudinal axis of the insertion probe.

5. The measurement device of claim 3, wherein the touch point is movable generally perpendicular to a longitudinal axis of the insertion probe.

6. The measurement device of claim 5, wherein the drive device coupled to a threaded shaft for moving the touch point and is selected from the group consisting of a stepper motor and a pulsed DC motor with planetary reduction gears.

7. The measurement device of claim 6, further comprising a ball socket attachment coupled to a shaft to which the touch point is attached.

8. The measurement device of claim 1, further comprising an identification key coupled to the insertion probe enabling the electromechanical head to identify the insertion probe.

9. A measurement device for determining wear in a turbo-machine, comprising:
    an electromechanical head assembly comprising a housing, at least one-touch point extending from the housing for contacting a surface of the turbo-machine, and a drive device for moving the touch point in contact with the surface;
    an insertion probe housing at least a portion of the electromechanical head assembly, the insertion probe attached to and extending at least partially into a vane-carrier of the turbo-machine;
    wherein the electromechanical head assembly is releasably coupled to the insertion probe such that the touch point of the electromechanical extends from the insertion probe and is adapted to contact the surface of the turbo-machine;
    a sensor for measuring a distance of travel of the touch point; and
    an identification key coupled to the insertion probe enabling the electromechanical head to identify the insertion probe.

10. The measurement device of claim 9, wherein the touch point is movable generally parallel to a longitudinal axis of the insertion probe with correction for nonlinear travel.

11. The measurement device of claim 9, wherein the touch point is movable generally perpendicular to a longitudinal axis of the insertion probe.

12. The measurement device of claim 11, wherein the drive device is coupled to a threaded shaft for moving the touch point and is selected from the group consisting of a stepper motor and a pulsed DC motor with planetary reduction gears.

13. The measurement device of claim 12, further comprising a ball socket attachment coupled to a shaft to which the touch point is attached.

14. The measurement device of claim 9, further comprising an electrical conductor for transmitting an electrical current to the touch point to determine when the touch point has contacted the surface of the machine.

15. A method of determining wear on a component of a machine while the machine is operating, comprising:
    attaching a measuring device to the machine, wherein the measuring device comprises an electromechanical head assembly comprising a housing, at least one touch point extending from the housing for contacting a surface of the machine, and a drive device for moving the touch point in contact with the surface;
        an insertion probe housing at least a portion of the electromechanical head assembly and attached to the machine;
        wherein the electronic head assembly is releasably coupled to the insertion probe;
        a sensor for measuring a distance of travel of the touch point; and
        an electrical conductor for transmitting an electrical current to the touch point for determining when the touch point has contacted the surface of the machine;
    establishing a benchmark from which a measurement may be taken;
    extending the touch point from the benchmark to contact a surface of the machine;
    measuring a distance the touch point moved from the benchmark to contact the surface of the machine;
    determining an amount of wear of the machine using the measured distance; and
    taking remedial action to prevent turbine engine damage if the determined amount of wear suggests that turbine engine damage may occur.

16. The method of determining wear in claim 15, wherein establishing a benchmark from which a measurement may be taken comprises withdrawing the touch point into the insertion probe until a voltage applied to the touch point falls to zero.

17. The method of determining wear of claim 15, wherein measuring a distance the touch point moved from the benchmark to contact the surface of the machine comprises advancing the touch point from the insertion probe until a voltage in the touch point falls to zero indicating that the touch point has contacted a surface of the machine.

18. The method of determining wear of claim 15, further comprising calculating a distance between the benchmark and the surface of the machine and storing the distance in the electromechanical head assembly.

* * * * *